US005895502A

United States Patent [19]

Yamamoto

[11] Patent Number: 5,895,502

[45] Date of Patent: Apr. 20, 1999

[54] DATA WRITING AND READING METHOD FOR A FRAME MEMORY HAVING A PLURALITY OF MEMORY PORTIONS EACH HAVING A PLURALITY OF BANKS

[75] Inventor: Hitoshi Yamamoto, Hyogo-Ken, Japan

[73] Assignee: Ricoh Company, LTD., Tokyo, Japan

[21] Appl. No.: 08/798,706

[22] Filed: Feb. 12, 1997

[30] Foreign Application Priority Data

Feb. 13, 1996 [JP] Japan .................................. 8-025153
Oct. 31, 1996 [JP] Japan .................................. 8-289964

[51] Int. Cl.[6] .................................................. G06F 12/06

[52] U.S. Cl. ............................... 711/218; 711/217; 711/5

[58] Field of Search ............................... 711/5, 217, 218, 711/100; 345/509, 508, 507; 365/230.03

[56] References Cited

U.S. PATENT DOCUMENTS 5,142,276 8/1992 Moffat ...................................... 340/799
5,598,517 1/1997 Watkins .................................. 395/141
5,717,441 2/1998 Serizawa et al ......................... 345/516
5,758,128 5/1998 Larson .................................... 395/507

FOREIGN PATENT DOCUMENTS 59-149391 8/1984 Japan .

*Primary Examiner*—Tod R. Swann
*Assistant Examiner*—Kevin Charles O'Malley
*Attorney, Agent, or Firm*—Oblon, Spivak, McClelland, Maier & Neustadt, P.C.

[57] ABSTRACT

A data writing and reading method for a frame memory which provides a high speed data access by using a memory which is divided into a plurality of portions each of which has a plurality of banks. The frame memory stores sets of data corresponding to an image to be displayed on a screen of a display unit. A set of data is written in one of the banks of one of the frame memory portions in accordance with two-dimensional accessing. Then another set of data is written in another one of the banks of one of the frame memory portions when that one of the memory portions is next accessed. The sets of data written in the frame memory is read in accordance with one-dimensional accessing.

7 Claims, 17 Drawing Sheets

WRITING OPERATION

READING OPERATION

FIG. 15A

| | | | | | | | | | |
|---|---|---|---|---|---|---|---|---|---|
| A0 | A1 | A2 | A3 | A4 | A5 | A6 | A7 | | |
| B0 | B1 | B2 | B3 | B4 | B5 | B6 | B7 | | |
| | | | | | | | | | |

FIG. 15B

M0

| β0 | | | β1 | | |
|---|---|---|---|---|---|
| A0 | A4 | | A2 | A6 | |
| B1 | B5 | | B3 | B7 | |
| | | | | | |

M1

| β0 | | | β1 | | |
|---|---|---|---|---|---|
| A1 | A5 | | A3 | A7 | |
| B0 | B4 | | B2 | B6 | |
| | | | | | |

| | | | | | | | | | |
|---|---|---|---|---|---|---|---|---|---|
| A0 | A1 | A2 | A3 | A4 | A5 | A6 | A7 | | |
| B0 | B1 | B2 | B3 | B4 | B5 | B6 | B7 | | |
| | | | | | | | | | |

| M0 | | | | | |
|---|---|---|---|---|---|
| β0 | | | β1 | | |
| A0 | A4 | | A1 | A5 | |
| B2 | B6 | | B3 | B7 | |
| | | | | | |

| M1 | | | | | |
|---|---|---|---|---|---|
| β0 | | | β1 | | |
| A2 | A6 | | A3 | A7 | |
| B0 | B4 | | B1 | B5 | |
| | | | | | |

DATA WRITING AND READING METHOD FOR A FRAME MEMORY HAVING A PLURALITY OF MEMORY PORTIONS EACH HAVING A PLURALITY OF BANKS

BACKGROUND OF THE INVENTION

1. Field of the Invention

The present invention generally relates to a data writing and reading method for a memory and, more particularly, to a data writing and reading method for writing and reading image data in a frame memory of a graphical display apparatus.

2. Description of the Related Art

A graphical display apparatus generally uses a frame memory to store image data therein. The image data includes dot data corresponding to each pixel obtained by scanning an image. The image data is written in the frame memory, and is read from the frame memory, when it is needed, by a predetermined sequence so that the dot data output from the frame memory is arranged in a predetermined sequence. Recently, in order to increase processing speed of image data, methods are suggested for increasing an access speed to the frame memory and increasing an amount of data which can be accessed by a single access operation. The amount of data accessible by a single access operation can be increased by increasing a width of a bus line.

However, in the method in which the width of the bus line is increased, the number of dots accessed at the same time is increased. Thus, there is a problem in that access is made to unnecessary dot data stored in the frame memory when an access is required for the dot data corresponding to only a small area.

Generally, the frame memory comprises a dynamic random access memory (DRAM). An operation of the DRAM requires a precharge operation. That is, in the operation of the DRAM, an access cannot be made immediately after a previous access has ended since a precharge operation must be performed before each reading operation. This increases an access interval for the frame memory comprising the DRAM. That is, a precharge period needed for the precharge operation is an obstacle to achieve a high speed access to the frame memory to provide an improved image drawing characteristic.

Japanese Laid-Open Patent Application No. 59-149391 discloses a high speed writing method for a frame buffer. In this method, a series of point data is written in the frame buffer. The point data comprises a series of dots represented by vector components obtained by a digital differential analyzer (DDA). The point data is stored in a DDA buffer having a predetermined storage capacity before it is written in the frame buffer. The frame buffer is divided into a plurality of portions each having a storage capacity equal to the storage capacity of the DDA buffer so as to write the data of the DDA buffer to the frame buffer by a single operation. However, this patent document is not directed to a concept of the data writing and reading method performed with a frame memory which is divided into a plurality of portions with each of the parts having a plurality of banks.

SUMMARY OF THE INVENTION

It is a general object of the present invention to provide an improved and useful data writing and reading method for a memory in which the above-mentioned problems are eliminated.

A more specific object of the present invention is to provide a data writing and reading method for a frame memory which provides high speed data access by using a memory which is divided into a plurality of portions each of which having a plurality of banks.

In order to achieve the above-mentioned objects, there is provided according to the present invention a data writing and reading method for a frame memory having a plurality of frame memory portions, each of the frame memory portions having a plurality of banks, the frame memory storing sets of data corresponding to an image to be displayed on a screen of a display unit, the data writing and reading method comprising the steps of:

- writing one of the sets of data in one of the banks of one of the frame memory portions in accordance with two-dimensional accessing;
- writing another one of the sets of data in another one of the banks of the one of the frame memory portions when the one of the memory portions is next accessed next; and
- reading the sets of data written in the frame memory in accordance with one-dimensional accessing.

According to the present invention, when one of the banks is accessed for writing operation, other banks are not accessed. Thus, preparation for a reading or writing operation for one of the banks can be performed while one of other banks is accessed. That is, for example, when the frame memory comprises a dynamic random access memory, a precharge operation for one of the banks can be performed while another of the banks is accessed. Thus, a writing operation and reading operation for the frame memory can be continuously performed without waiting for a precharge period. This increases an access speed for the frame memory.

In the data writing and reading method according to the present invention, the frame memory is divided into two frame memory portions M0 and M1, each of the frame memory portions M0 and M1 having two banks B0 and B1, and the sets of data written in the frame memory is image data. The construction in which the frame memory has two frame memory portions each having the two banks is the simplest construction to achieve the present invention.

In one embodiment of the present invention, the sets of data include at least first sets of data A0, A1, A2, . . . , A(n-1), A(n), . . . arranged in a line A extending in a horizontal direction of the screen and second sets of data B0, B1, B2, . . . , B(n-1), B(n), . . . arranged in a line B extending in the horizontal direction of the screen, the line B being next to the line A on the screen, and wherein the data A(n) and the data B(n) are stored in same number banks of different frame memory portions, respectively; the data A(n-1) and the data A(n) are stored in different number banks of different frame memory portions, respectively, except for data A(αn-1) and data A(αn) being stored in different number banks of the same frame memory portion; the data B(n-1) and the data B(n) are stored in the different number banks of different frame memory portions, respectively, except for data B(αn-1) and data B(αn) being stored in different number banks of the same frame memory portion, where the factor α is a power of 2; so that the sets of data are stored in a sequence:

storing the data [A0, B0] in [M0(β0), M1(β0)];
storing the data [A1, B1] in [M1(β1), M0(β1)];
storing the data [A2, B2] in [M0(β0), M1(β0)];
storing the data [A3, B3] in [M1(β1), M0(β1)];
storing the data [A4, B4] in [M1(β0), M0(β0)];
storing the data [A5, B5] in [M0(β1), M1(β1)];
storing the data [A6, B6] in [M1(β0), M0(β0)];

storing the data [A7, B7] in [M0(β1), M1(β1)];

storing the data [A(n), B(n)] in [M1(β1), M1(β0)], where [A(n), B(n)] represents a combination of the data A(n) and the data B(n); M0(β0) represents the bank β0 of the frame memory portion M0; M0(β1) represents the bank β1 of the frame memory portion M0; M1(β0) represents the bank β0 of the frame memory portion M1; M1(β1) represents the bank β1 of the frame memory portion M1.

Additionally, in another embodiment of the present invention, the sets of data include at least first sets of data A0, A1, A2, . . . , A(n-1), A(n), . . . arranged in a line A extending in a horizontal direction of the screen and second sets of data B0, B1, B2, . . . , B(n-1), B(n), . . . arranged in a line B extending in the horizontal direction of the screen, the line B being next to the line A on the screen, and wherein the data A(n) and the data B(n) are stored in same number banks of different frame memory portions, respectively; with respect to the data A(n-1) and the data A(n) in the same line A, the frame memory portion is changed every time, while the bank number is changed every other time; with respect to the data B(n-1) and the data B(n) in the same line B, the frame memory portion is changed every time, while the bank number is changed every other time; so that the sets of data are stored in a sequence:

storing the data [A0, B0] in [M0(β0), M1(β0)];

storing the data [A1, B1] in [M1(β0), M0(β0)];

storing the data [A2, B2] in [M0(β1), M1(β1)];

storing the data [A3, B3] in [M1(β1), M0(β1)];

storing the data [A(n), B(n)] in [M1(β1), M1(β1)], where [A(n), B(n)] represents a combination of the data A(n) and the data B(n); M0(β0) represents the bank β0 of the frame memory portion M0; M0(β1) represents the bank β1 of the frame memory portion M0; M1(β0) represents the bank β0 of the frame memory portion M1; M1(β1) represents the bank β1 of the frame memory portion M1.

In this embodiment, the step of reading the sets of data stored in the frame memory may be performed in a sequence:

reading the data stored in [M0(β0), M1(β0)];

reading the data stored in [M0(β1), M1(β1)];

reading the data stored in [M0(β0), M1(β0)];

reading the data stored in [M0(β1), M1(β1)];

reading the data stored in [M0(β1), M1(β1)], so that the sets of data to be consecutively arranged are read in a single access to the frame memory.

Additionally, in another embodiment according to the present invention, the sets of data include at least first sets of data A0, A1, A2, . . . , A(n-1), A(n), . . . arranged in a line A extending in a horizontal direction of the screen and second sets of data B0, B1, B2, . . . , B(n-1), B(n), . . . arranged in a line B extending in the horizontal direction of the screen, the line B being next to the line A on the screen, and wherein the data A(n) and the data B(n) are stored in same number banks of different frame memory portions, respectively; with respect to the data A(n-1) and the data A(n) in the same line A, the frame memory portion is changed every other time, while the bank number is changed every time; with respect to the data B(n-1) and the data B(n) in the same line B, the frame memory portion is changed every other time, while the bank number is changed every time; so that the sets of data are stored in a sequence:

storing the data [A0, B0] in [M0(β0), M1(β0)];

storing the data [A1, B1] in [M0(β1), M1(β1)];

storing the data [A2, B2] in [M1(β0), M0(β0)];

storing the data [A3, B3] in [M1(β1), M0(β1)];

storing the data [A(n), B(n)] in [M1(β1), M0(β1)], where [A(n), B(n)] represents a combination of the data A(n) and the data B(n); M0(β0) represents the bank β0 of the frame memory portion M0; M0(β1) represents the bank β1 of the frame memory portion M0; M1(β0) represents the bank β0 of the frame memory portion M1; M1(β1) represents the bank β1 of the frame memory portion M1.

Other objects, features and advantages of the present invention will become more apparent from the following detailed description when read in conjunction with the accompanying drawings.

BRIEF DESCRIPTION OF THE DRAWINGS

Figures 15A, 15B:
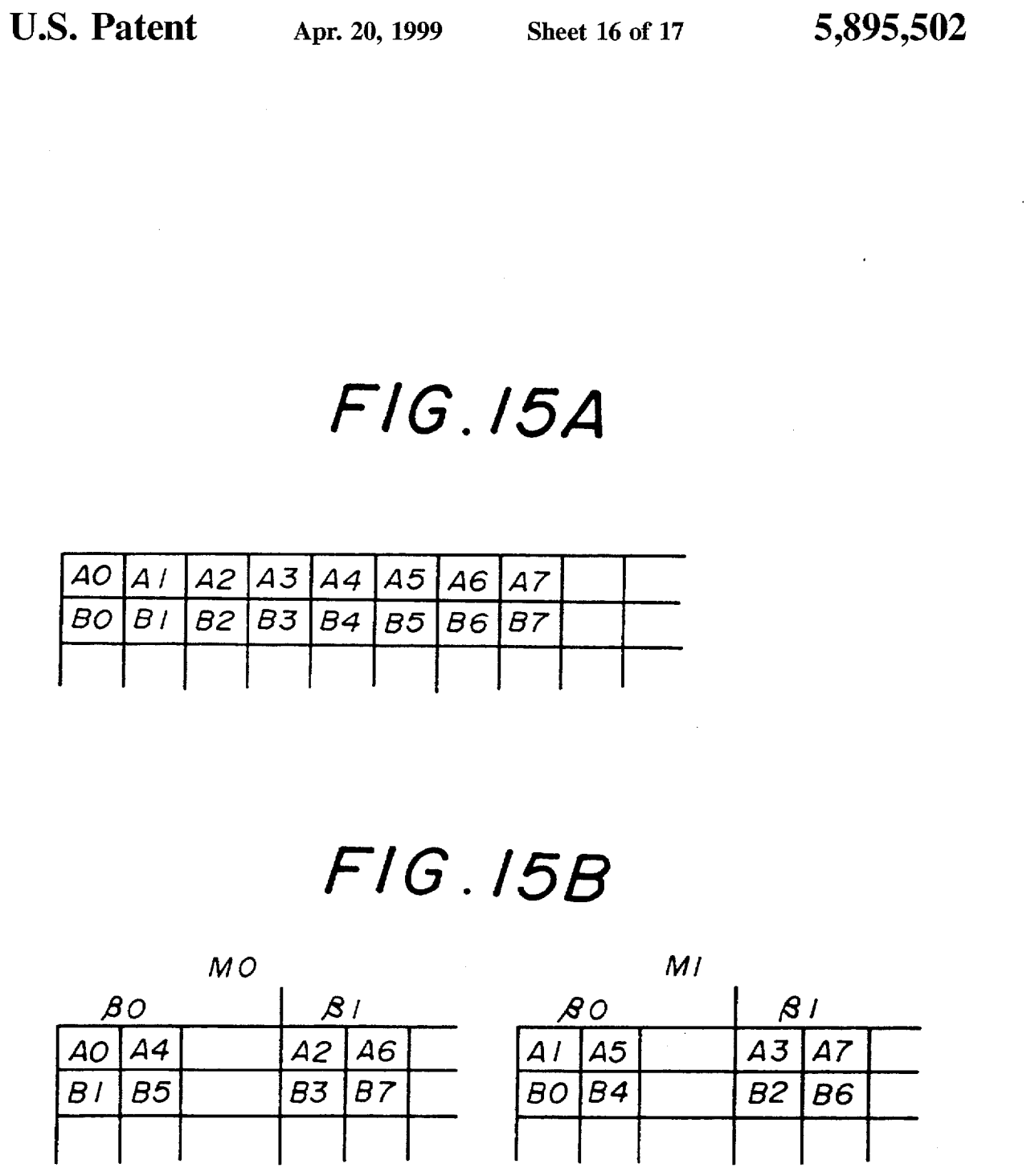

FIG. 15A is an illustration of a data arrangement which corresponds to a dot arrangement on a screen; FIG. 15B is an illustration of the contents stored in the banks of each of the frame memory portions according to a second embodiment of the present invention;

DETAILED DESCRIPTION OF THE PREFERRED EMBODIMENTS

Figure 1:
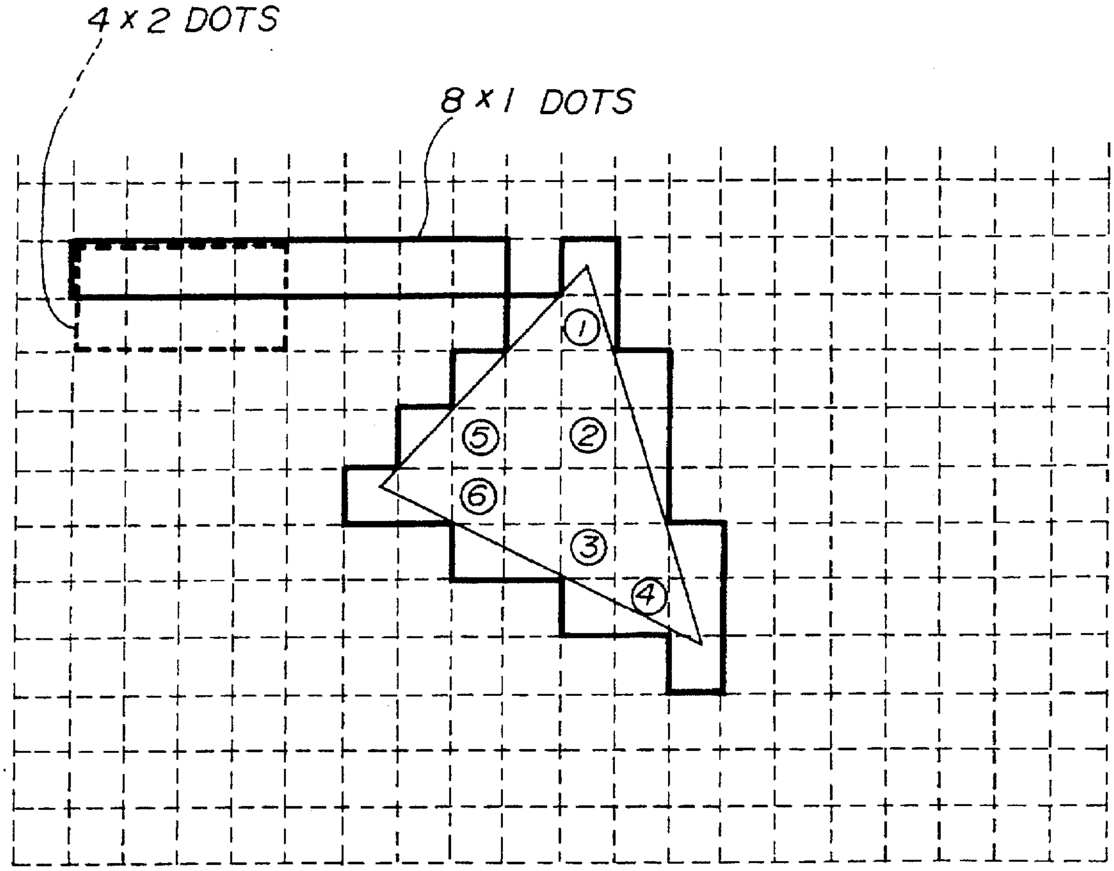
FIG. 1 is an illustration of a data area including polygon data for explaining a one-dimensional access and a two-dimensional access.

A description will now be given, with reference to FIGS. 1 and 2, of a concept of the present invention.

Many graphical display apparatuses are directed to process polygon data which is written in a frame memory. In the present invention, a frame memory is divided into a plurality of portions, for example, two portions, so that a two-dimensional access can be performed as shown in FIG. 1. In FIG. 1, if a one-dimensional access is made, 8 dots which are consecutively arranged in a single row are accessed at the same time. If a two-dimensional access is made, 8 dots which are arranged, for example, in a (4×2) matrix can be accessed at the same time. That is, dot data corresponding to the dots arranged in a single row is accessible according to the one-dimensional access, whereas dot data corresponding to dots arranged in an (m×n) matrix is accessible according to the two-dimensional access.

According to the concept of the present invention, a two-dimensional access is made when dot data is written in the frame memory while a one-dimensional access is made when the dot data is read from the frame memory. If the one-dimensional access is made when the dot data corresponding to a polygon shown in FIG. 1 is written in the frame memory, 12 accesses are needed to obtain the dot data of the polygon. That is, 12 areas must be accessed, each of the areas comprising 8 dots arranged in a single row. On the other hand, if the two-dimensional access is made when the dot data corresponding to the polygon shown in FIG. 1 is written in the frame memory, only 6 accesses are needed to be accessed to obtain the dot data of the polygon. That is 6 areas numbered from 1 to 6 must be accessed, each of the areas comprising 8 dots arranged in a (4×2) matrix. Thus, if two-dimensional access is used, the number of accesses is greatly reduced when the dot data of the polygon is written in the frame memory. It should be noted that the one-dimensional access is still required when a read operation for the dot data stored in the frame memory is performed.

Figure 2A:
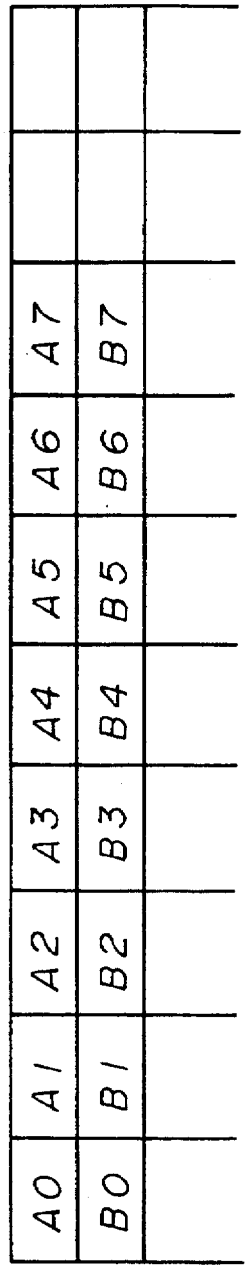
FIG. 2A is an illustration showing a data arrangement corresponding to a dot arrangement on a screen.
Figure 2B:
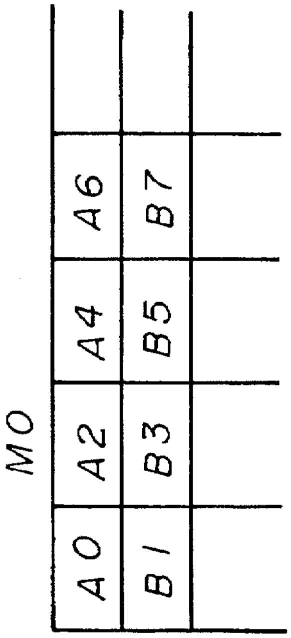
FIGS. 2B and 2C are illustrations showing contents of two frame memory portions, respectively.
Figure 2C:
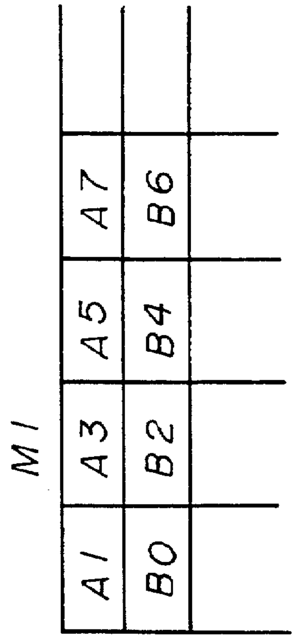

FIG. 2A is an illustration showing a data arrangement corresponding to a dot arrangement on a screen. FIGS. 2B and 2C are illustrations showing contents of two frame memory portions M0 and M1, respectively. In FIGS. 2A, 2B and 2C, each dot data A0, A1, B0, . . . comprises (4×1) dots. The letter A indicates a row number A. The letter B indicates a row number B which is next to the row A. If each dot is represented by 8-bit data, each dot data A0, A1, B0, becomes 32-bit data. Additionally, the width of a bus connected to the frame memory is set to 64 bits. That is, the amount of data accessible at the same time is 64 bits.

When the data is written, a two-dimensional access is performed with respect to the data A0 and B0. The data A0 is written in the frame memory portion M0, and the data B0 is written in the frame memory portion M1. Then, the two-dimensional access is performed with respect to the data A1 and B1. The data A1 is written in the frame memory portion M0, and the data B1 is written in the frame memory portion M1. Thereafter, similar accesses are performed for the frame memory portions M0 and M1 so that the sets of data are written as shown in FIGS. 2B and 2C.

On the other hand, when the dot data is read, a one-dimensional access is performed. That is, the (8×1) dot data corresponding to the data A0 and A1 is read, and then (8×1) dot data corresponding to the data A2 and A3 is read, and so on. It should be noted that since the data B0 is stored in the frame memory portion M0 and the data B1 is stored in the frame memory portion M1, the data B0 and the data B1 are temporarily stored in shift registers (not shown in the figures) so that the data B0 and the data B1 are output in a predetermined order. Other sets of data B2 and B3, B4 and B5, . . . are also read in the same manner.

The present invention is based on the above mentioned concept. However, in the above-mentioned concept, a decrease in data processing speed due to a precharge period cannot be eliminated when a DRAM is used as the frame memory. The present invention suggests a method for writing and reading data in a frame memory comprising a DRAM which method improves data processing speed.

Figure 3:
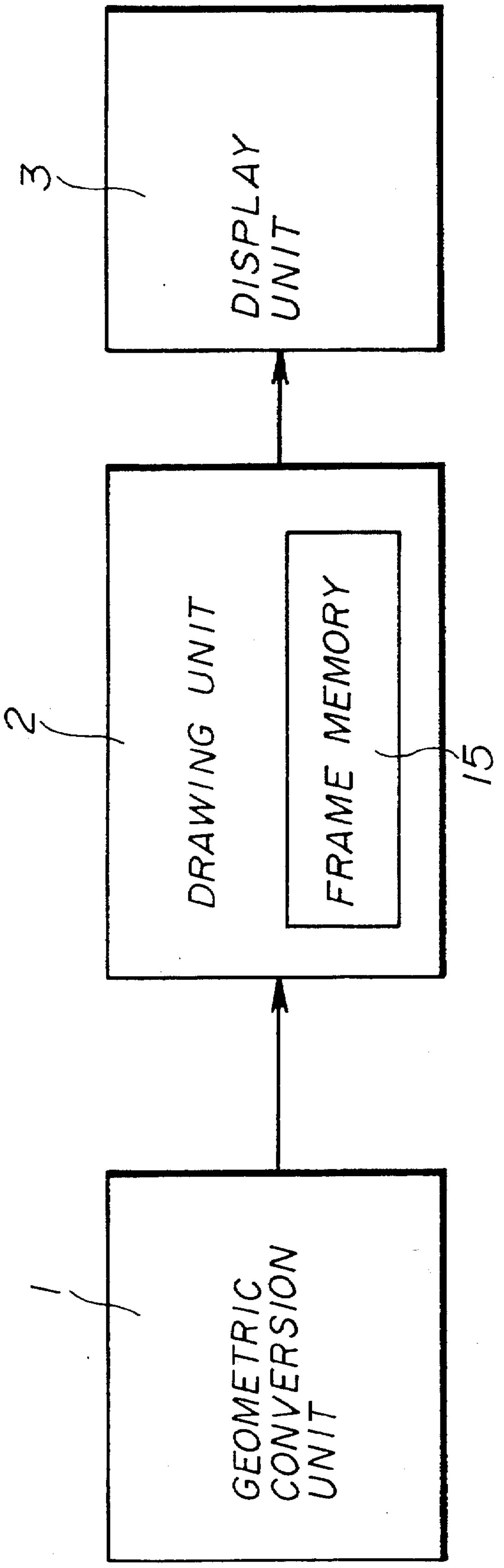
FIG. 3 is a block diagram of a three-dimensional graphical display apparatus which performs a data writing and reading method according to the present invention.

FIG. 3 is a block diagram of a three-dimensional graphical display apparatus which performs a data writing and reading method according to the present invention. The three-dimensional graphical display apparatus shown in FIG. 3 comprises a geometric conversion unit 1, a drawing unit 2 and a display unit 3.

The geometric conversion unit 1 performs processes referred to as a modeling conversion process, a visual field conversion process and a perspective conversion process. These processes are performed on data of a single three-dimensional polygon as a minimum data unit.

The drawing unit 2 obtains pixel data in accordance with plane coordinate values of a polygon produced by the geometric conversion unit 1. The pixel data may be RGB data or LUT (look up table) address data. The drawing unit 2 writes the pixel data in a frame memory 15. The drawing unit 2 also reads the pixel data in the frame memory 15, and sends the data to the display unit 3.

The display unit 3 displays a picture (polygons) on a screen (not shown in the figures) based on the pixel data supplied by the drawing unit 2.

Figure 4:
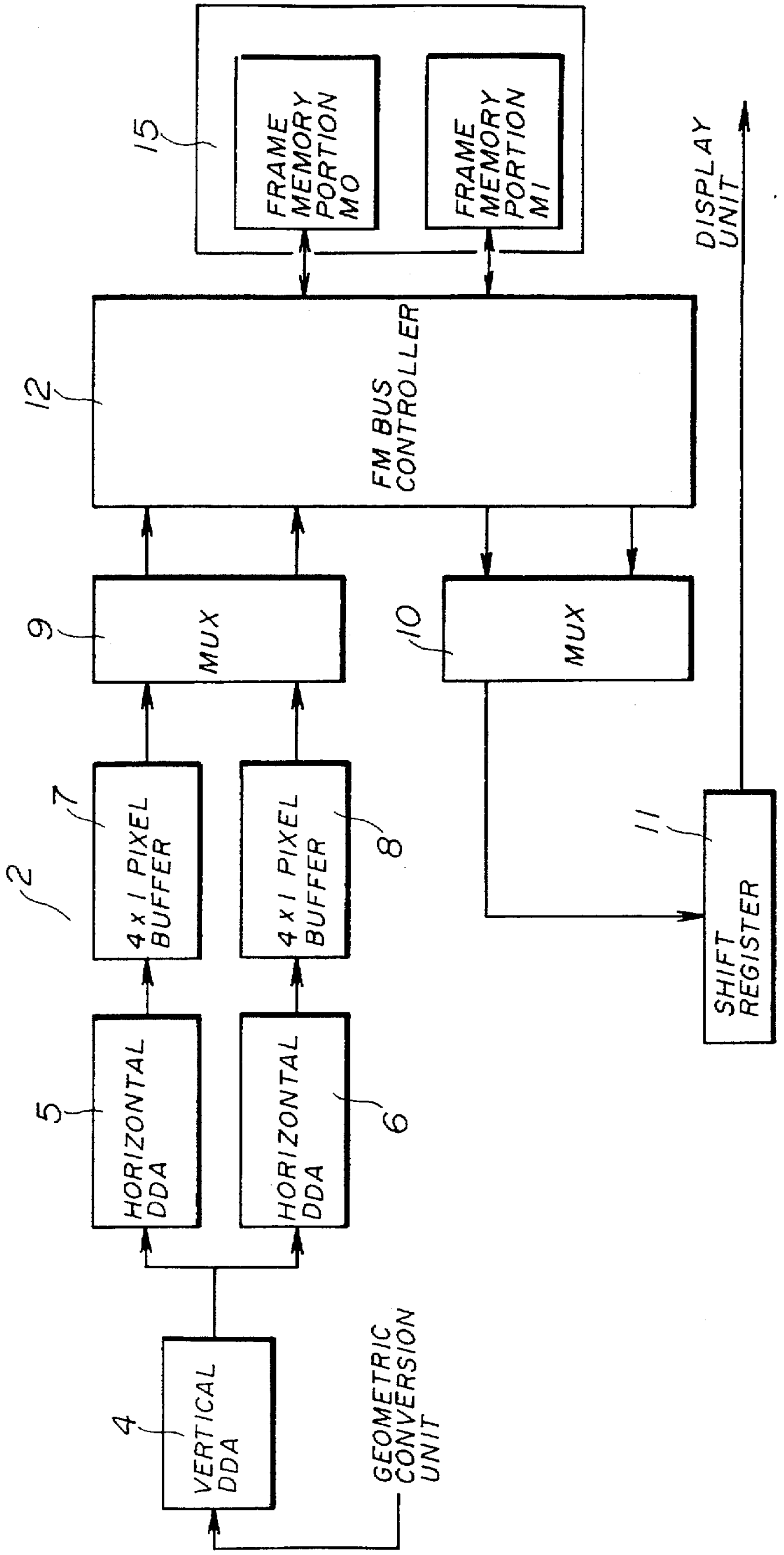
FIG. 4 is a block diagram of a drawing unit shown in FIG. 3.

FIG. 4 is a block diagram of the drawing unit 2. The data reading and writing method is performed by the drawing unit 2. In the drawing unit 2, the polygon data from the geometric conversion unit is input to a vertical DDA 4. The vertical DDA 4 obtains data of right and left vertices of each horizontal line by calculation of right and left edge data of each polygon, and sends the data to the horizontal DDAs 5 and 6. The data of right and left vertices represents, for example, positional information of each pixel on an edge of the polygon shown in FIG. 1. The horizontal DDAs 5 and 6 obtain pixel data corresponding to a portion between the left and right vertices on the screen. The pixel data is written in the buffers 7 and 8.

Figure 5:
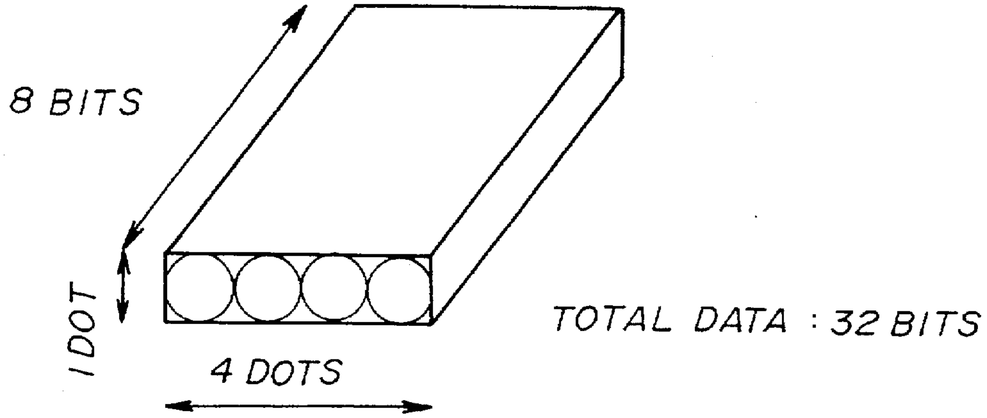
FIG. 5 is an illustration of dot data corresponding to (4×1) dots.

Each dot, which corresponds to a single pixel, comprises 8 bits. These dots are processed by a unit of four consecutive dots. This corresponds to the (4×1) dot area shown in FIG. 1. Accordingly, each of the buffers 7 and 8 stores the pixel data corresponding to (4×1) dots as illustrated in FIG. 5. Thus, a width of a bus connected to each of the buffers 7 and 8 is 32 bits. The reason for providing the two vertical DDAs 5 and 6 and the two buffers 7 and 8 is to perform a two-dimensional drawing write operation for each two lines at the same time.

The buffers 7 and 8 are connected to the frame memory 15 via a multiplexer (MUX) 9 and an FM bus controller 12.

When the buffers 7 and 8 are filled with data, that is, when data corresponding to (4×2) dots is stored, the data is sent to the FM bus controller 12 via the MUX 9. The MUX 9 is controlled by X-coordinate addresses of the screen which represents the data corresponding to (4×2) dots. The MUX 9 outputs the data corresponding to (4×2) dots to the FM bus controller 12 by exchanging the two 32-bit buses.

Figure 6A:
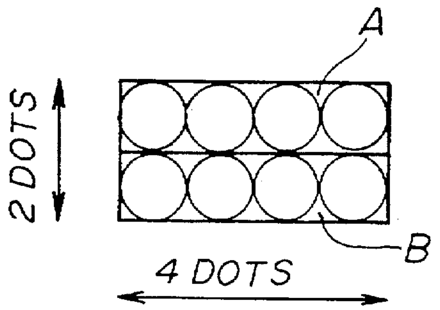
FIG. 6A is an illustration of dot data corresponding to (4×2) dots.
Figure 6B:
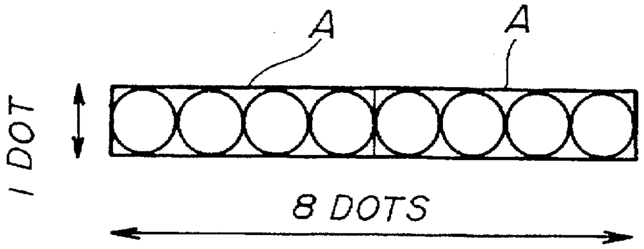
FIG. 6B is an illustration of dot data corresponding to (8×1) dots.

The FM bus controller 12 writes the data corresponding to (4×2) dots as illustrated in FIG. 6A to the frame memory 15 at the same time. That is, when a writing operation is performed, the unit data comprises 4 dots by 2 lines. On the other hand, the FM bus controller 12 reads the data corresponding to (8×1) dots as illustrated in FIG. 6B from the frame memory 15 at the same time. That is, when a reading operation is performed, the unit data comprises 8 dots by 1 line.

The frame memory 15 has the two frame memory portions M0 and M1 as shown in FIG. 4. Each of the frame memory portions M0 and M1 operates on a 32 bits basis. In this embodiment, each of the frame memory portions comprises a synchronous DRAM. Hereinafter, the frame memory portions M0 and M1 together may be referred to as a frame memory M, in general.

Each of the frame memory portions M0 and M1 has two banks β0 and β1. Hereinafter, the banks β0 and β1 together may be referred to as a bank β, in general. The banks β0 and β1 are alternately accessed to allow a high speed access for the frame memory M.

Figure 7:
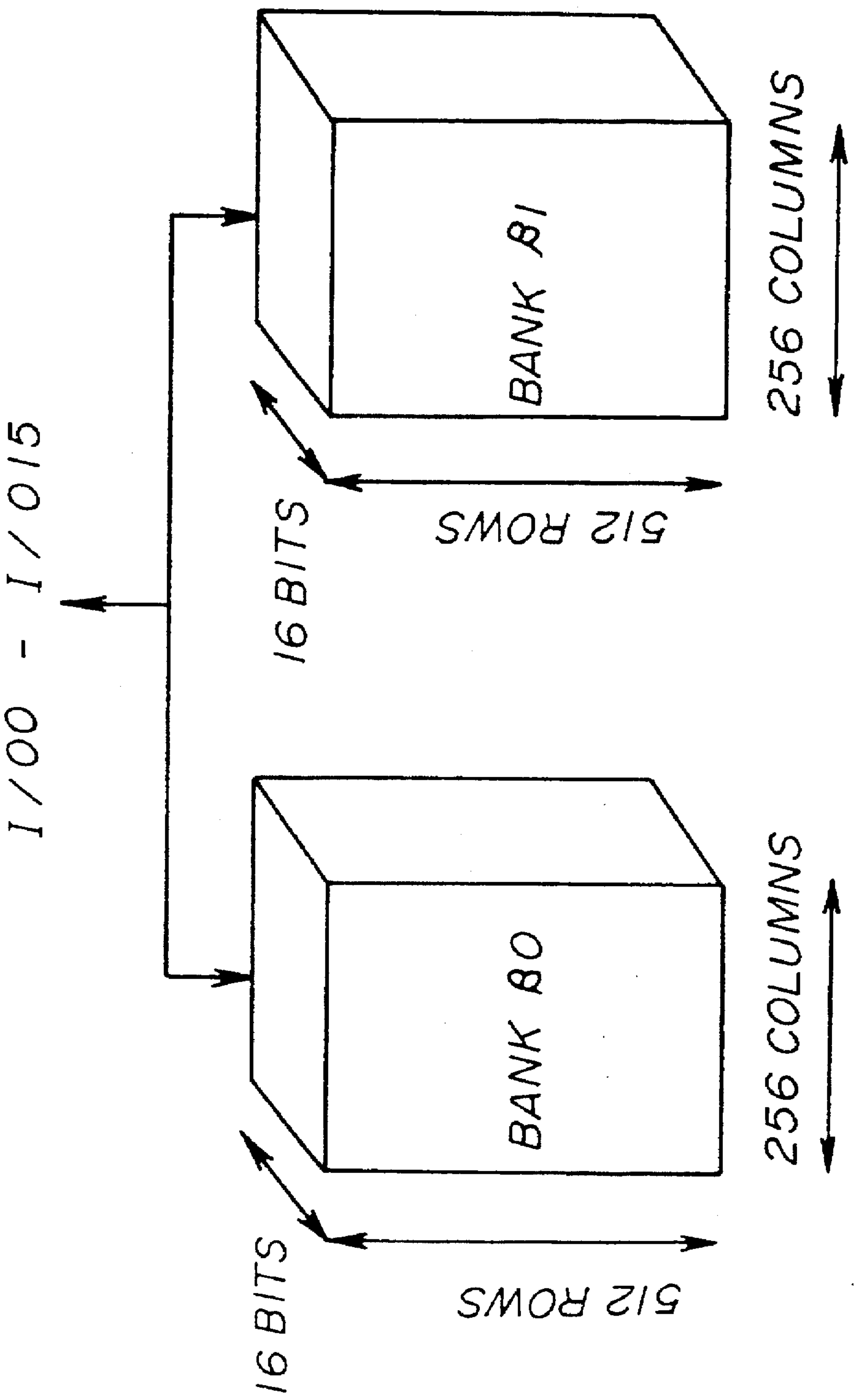
FIG. 7 is an illustration of a structure of a DRAM used as each of the frame memory portions shown in FIG. 4.
Figure 8A:
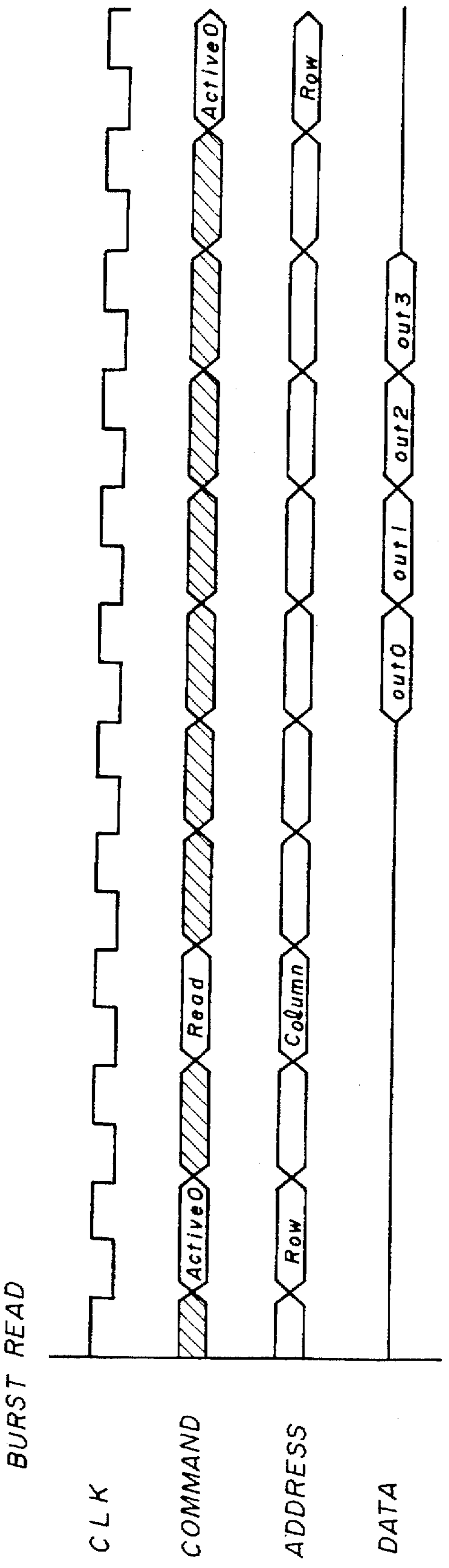
FIG. 8A is a timing chart of a burst read operation for a DRAM.
Figure 8B:
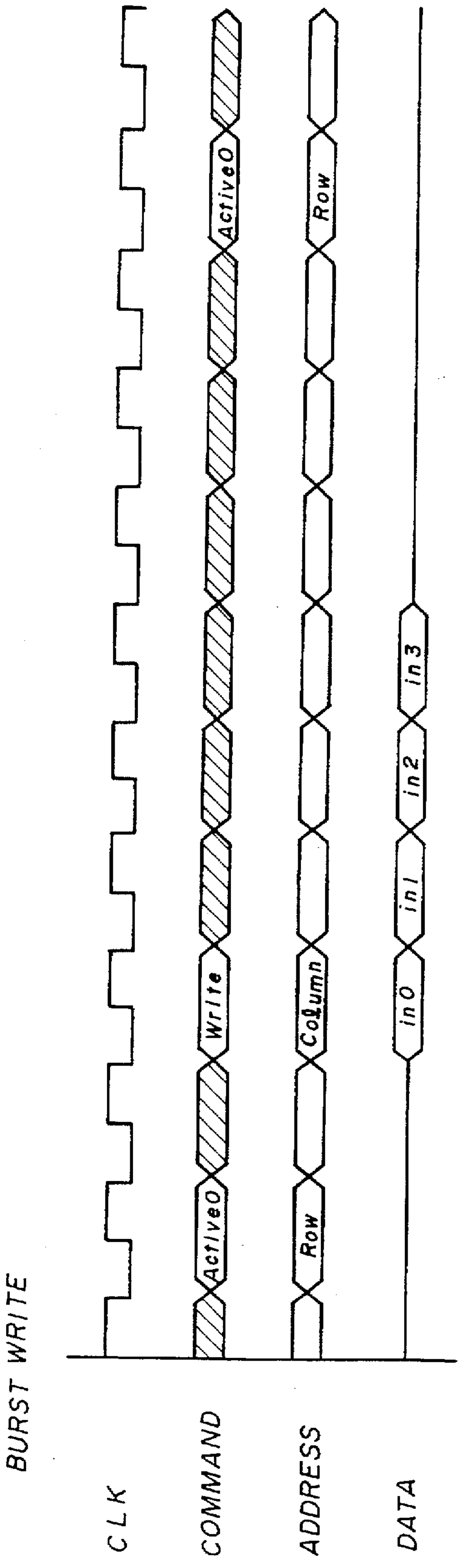
FIG. 8B is a timing chart of a burst write operation for the DRAM.

A description will now be given, with reference to FIGS. 7, 8A and 8B, of an operation of the frame memory M comprising a synchronous DRAM. FIG. 7 is an illustration of a structure of a DRAM used as the frame memory M. FIG. 8A is a timing chart of a burst read operation of the DRAM; FIG. 8B is a timing chart of a burst write operation of the DRAM. The timing charts of FIGS. 8A and 8B show a case where CAS Latency=3 and Burst length=4.

In FIG. 8A, when a row address of the bank β0 is rendered to be in an active state by an Active0 command and a column address is supplied by a read command, data is output from the third cycle from the read command cycle. When the bank β0 is activated next time, the activation of the bank β0 is allowed by an Active0 command which is input after one cycle is passed after the last data is output. That is, another Active0 command for the bank β0 cannot be input until at least one cycle has passed after the last data is output. However, since the bank β1 is separately provided in the DRAM, data in the bank β1 can be accessible at any cycle excluding the cycles corresponding to the Active0 command and the read command for the bank β0. That is, the Active0 command for the bank β1 can be input at any hatched cycle shown in FIG. 8A. This means that the Active0 command for the bank β1 can be input immediately after the read command for the bank β0 is input. Thus, a high speed access is achieved when the read operation is performed. The burst read operation can be performed similarly to the burst write operation by alternately using the banks β0 and β1. Thus, a high speed access can be performed also in the burst read operation.

Referring to FIG. 4, a multiplexer (MUX) 10 is connected to the FM bus controller 12. The MUX 10 selects necessary 32-bit data from 32-bit data output from the frame memory portions M0 and M1. The selected 32-bit data is supplied to a shift register 11.

Figure 9:
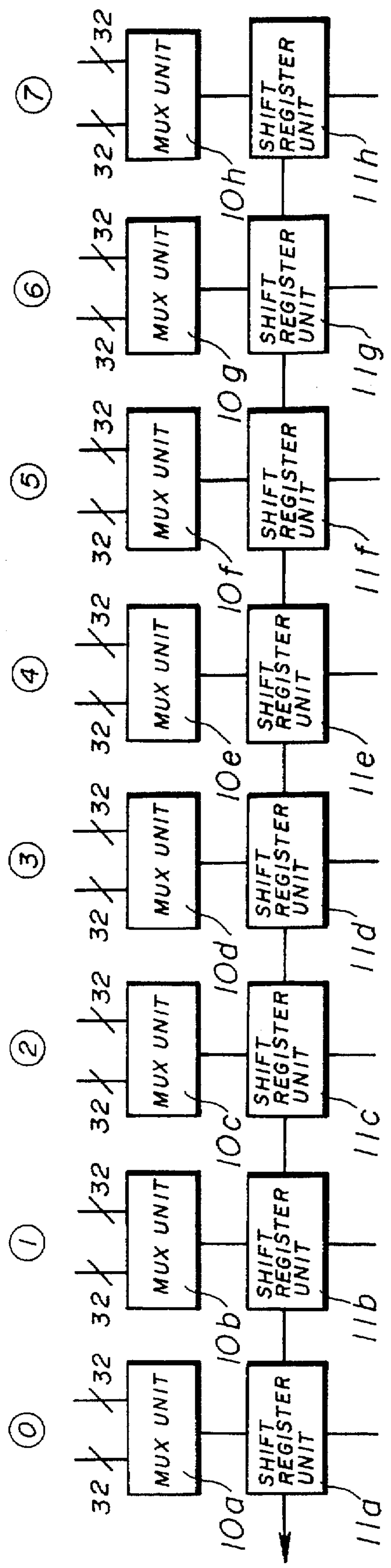
FIG. 9 is a block diagram for explaining a connection between a multiplexer and a shift register shown in FIG. 4.

FIG. 9 is a block diagram for explaining a connection between the MUX 10 and the shift register 11. The MUX 10 comprises 8 MUX units 10*a* to 10*h*. The shift register 11 also comprises 8 shift register units 11*a* to 11*h*. The MUX units 10*a* to 10*h* are connected to the shift register units 11*a* to 11*h*, respectively. Each of the shift register units 11*a* to 11*h* can store dot data corresponding to (4×1) dots, which corresponds to 32-bit data. A timing to store the dot data is determined by a control signal supplied to each of the shift register units 11*a* to 11*h*. The selection of 32-bit data performed by each of the MUX units 10*a* to 10*h* is made based on a control signal supplied thereto.

Figure 10A:
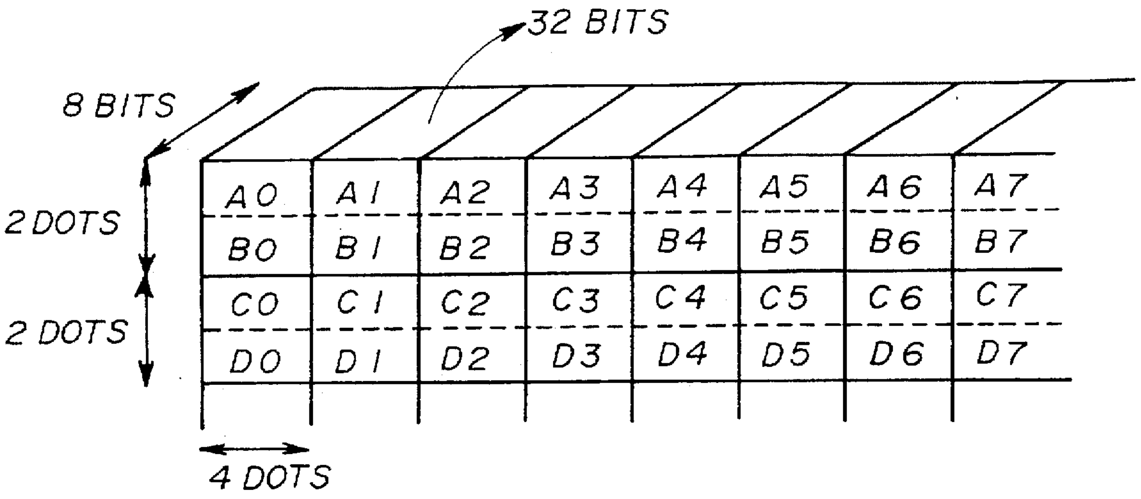
FIG. 10A is an illustration of an arrangement of dot data which corresponds to a dot arrangement on a screen.
Figure 10B:
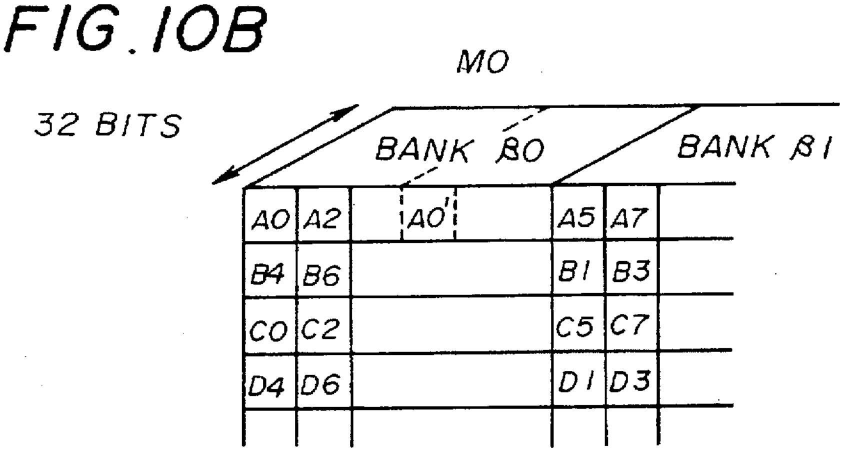
FIG. 10B is an illustration showing dot data stored in banks of a frame memory portion.
Figure 10C:
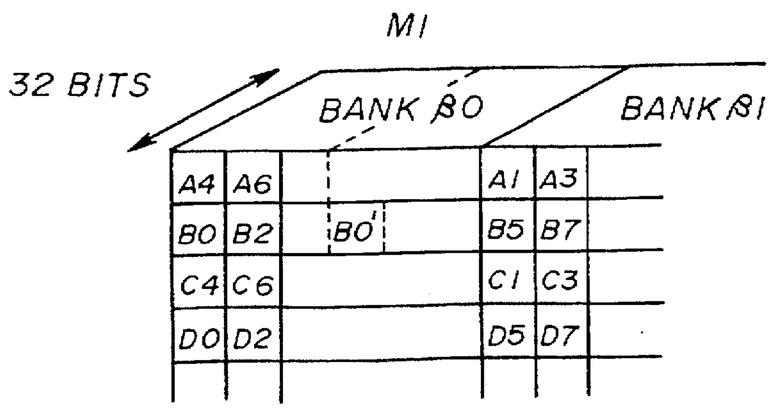
FIG. 10C is an illustration showing dot data stored in the banks of another frame memory portion.

A description will now be given, with reference to FIG. 10A, 10B and 10C, of a drawing write operation. FIG. 10A is an illustration of an arrangement of dot data which corresponds to a dot arrangement on the screen. FIG. 10B is an illustration showing dot data stored in the banks β0 and β1 of the frame memory portion M0; FIG. 10C is an illustration showing dot data stored in the banks β0 and β1 of the frame memory portion M1.

In FIGS. 10A, 10B and 10C, each dot data A0, A1, B0, . . . comprises (4×1) dots. The letter A indicates a row number A. The letter B indicates a row number B which is next to the row A. The letter C indicates a row number C which is next to the row B. The letter D indicates a row number D which is next to the row C. If each dot is represented by 8-bit data, each dot data A0, A1, B0, . . . becomes 32-bit data. Additionally, the width of a bus connected to the frame memory 15 is set to 64 bits. That is, the amount of data accessible at the same time is 64 bits.

When the data is written, a two-dimensional access is performed with respect to the data A0 and B0 which corresponds to (4×2) dots. Hereinafter, the combination of data A(n) and data B(n) may be referred to as data [A(n), B(n)], where n is an integer. The data A0 is written in the bank β0 of the frame memory portion M0, and the data B0 is written in the bank β0 of the frame memory portion M1. Then, a two-dimensional access is performed with respect to the data A1 and B1 which corresponds to (4×2) dots. The data A1 is written in the bank β1 of the frame memory portion M1, and the data B1 is written in the bank β1 of the frame memory portion M0. Thereafter, similar accesses are performed for the frame memory portions M0 and M1 so that the sets of data are written as shown in FIGS. 10B and 10C.

The data storage according to the above-mentioned write operation with respect to the banks β0 and β1 of each of the frame memory portions M0 and M1 is shown below, where M0(β0) represents the bank β0 of the frame memory portion M0; M0(β1) represents the bank β1 of the frame memory portion M0; M1(β0) represents the bank β0 of the frame memory portion M1; M1(β1) represents the bank β1 of the frame memory portion M1:

store the data [A0, B0] in [M0(β0), M1(β0)];
store the data [A1, B1] in [M1(β1), M0(β1)];
store the data [A2, B2] in [M0(β0), M1(β0)];
store the data [A3, B3] in [M1(β1), M0(β1)];
store the data [A4, B4] in [M1(β0), M0(β0)];
store the data [A5, B5] in [M0(β1), M1(β1)];
store the data [A6, B6] in [M1(β0), M0(β0)];
store the data [A7, B7] in [M0(β1), M1(β1)];

That is, the data A(n) and the data B(n) are stored in same number banks of different frame memory portions, respectively. The data A(n-1) and the data A(n) are stored in different number banks of different frame memory portions, respectively, except for data A(αn-1) and data A(αn) being stored in different number banks of the same frame memory portion, where the factor α is a power of 2. In this embodiment, the factor α is set to 4. The data B(n-1) and the data B(n) are stored in different number banks of different frame memory portions, respectively, except for data B(αn-1) and data B(αn) being stored in different number banks of the same frame memory portion, where the factor α is a power of 2. In this embodiment, the factor α is set to 4.

On the other hand, when the dot data is read, a one-dimensional access is performed. That is, the (8×1) dot data corresponding to the data A0 and A4 is read from the bank β0 of each of the frame memory portions M0 and M1 Then, (8×1) dot data corresponding to the data A5 and A1 is read from the bank β1 of each of the frame memory portions M0 and M1, and so on. It should be noted that although the bank β0 and the bank β1 are used alternately in the above-mentioned data writing method, the same number bank may be used for each two times of access so that, for example, the bank β1 is accessed twice after the bank β0 has been accessed twice.

When the read operation of the data A0 and the data A4 is performed, the shift register units 11*a* and 11*e* are switched to a data writable state. Additionally, the MUX unit 10*a* connected to the shift register unit 11*a* is set to select the data A0, and the MUX unit 10*e* connected to the shift register unit 11*e* is set to select the data A4. Next, when the data A5 and the data A1 are read, the MUX unit 10*f* connected to the shift register unit 11*f* is set to select the data A5, and the MUX unit 10*b* connected to the shift register unit 11*b* is set to select the data A1. Other data is read in the same manner. Thus, the data A0 to A7 is sequentially stored in corresponding shift register units 11*a* to 11*h*. Accordingly, the data A0, A1, A2, . . . and A7 is output from the shift register 11 in that order.

Figure 11A:
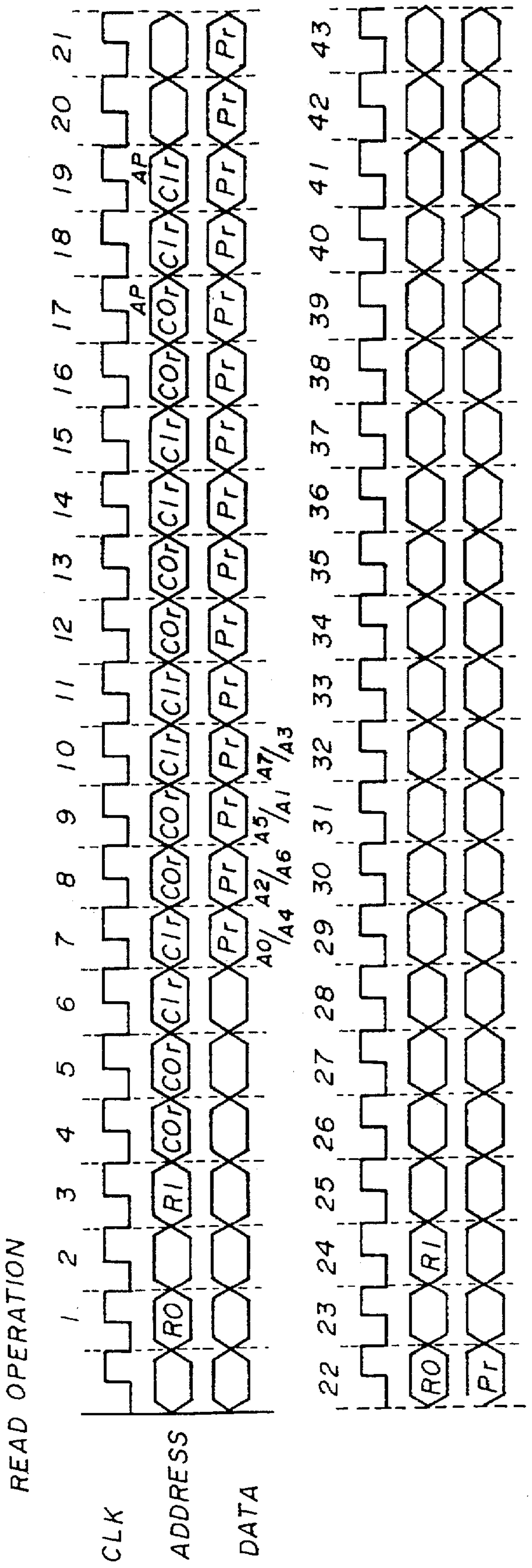
FIG. 11A is a timing chart of a read operation for a bank of the frame memory portion when 1 dot comprises 8 bits.
Figure 11B:
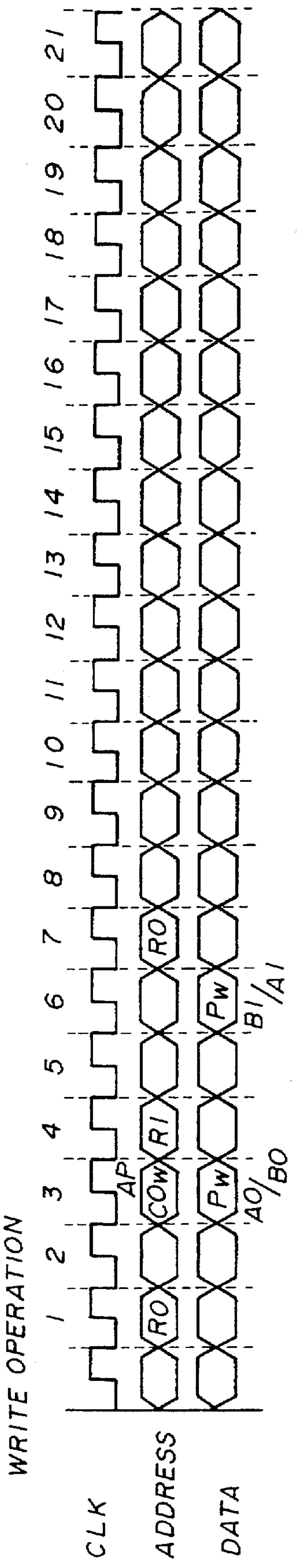
FIG. 11B is a timing chart of a write operation for the bank of the frame memory portion when 1 dot comprises 8 bits.

A description will now be given, with reference to FIGS. 11A and 11B, of a timing of a read operation and a write operation for the frame memory M. FIG. 11A is a timing chart of the read operation for the bank B of the frame memory portion M when 1 dot comprises 8 bits. FIG. 11B is a timing chart of the write operation for the bank β of the frame memory portion M when 1 dot comprises 8 bits. The timing charts of FIGS. 11A and 11B show a case where CAS Latency=3 and Burst length=1.

As shown in FIG. 11B, when the write operation is performed, the column address (COw) of the bank β0 is set in a clock cycle which is two clock cycles after the row address (R0) of the bank β0 was set. The data (Pw) is written at this timing. Then, the row address (R1) of the bank β1 is set in the clock cycle next to the cycle of the column address (COw). Thereafter, the column address is sequentially set in the same manner. It should be noted that "A0/B0" and "B1/A1" shown in FIG. 11B indicate contents of the written data (Pw) which correspond to the data arrangement shown in FIGS. 10B and 10C. For example, "A0/B0" indicates that the data A0 is stored in the bank β0 of the frame memory portion M0 and the data B0 is stored in the bank β0 of the frame memory portion M1.

When the read operation is performed, as shown in FIG. 11A, the row address (R1) of the bank β1 is set in a clock cycle which is two clock cycles after the row address (R0) of the bank β0 was set. Then, two sets of column addresses (C0r, C0r), (C1r, C1r) are repeatedly set. Since the data (Pr) is read from the third clock cycle from the cycle of the column address, 16 data read operations are consecutively performed for each of the frame memory portions M0 and M1. It should be noted that "A0/A4", "A2/A6", . . . shown in FIG. 11B indicate contents of the read data (Pw) which corresponds to the data arrangement shown in FIGS. 10B and 10C. For example, "A0/A4" indicates that the data A0 is read from the bank β0 of the frame memory portion M0 and the data A4 is read from the bank β0 of the frame memory portion M1.

In order to perform the above-mentioned read operation, the shift register 11 shown in FIG. 4 comprises two buffers each of which has a capacity of (128 dots×8 bits). The data (128 dots×8 bits) which is obtained by 16 data read operations, is stored in one of the buffers. The data (128 dots×8 bits) which is obtained by the next 16 data read operations is stored in the other one of the buffers while the data stored in the one of the buffers is supplied to the display unit 3.

It should be noted that although 16 data accesses are made in FIG. 11A, since the data A0 to A7, which should be consecutively arranged, can be read by 4 data accesses, the MUX 10 and the shift register 11 may have a basic structure which can perform the operation shown in FIGS. 8A and 8B. The reason for performing 16 data accesses is to handle a case where a single dot corresponds to 16-bit color or 24-bit color as well as the 8-bit color and to eliminate some precharge periods by increasing a continuous read operation period.

Figure 12A:
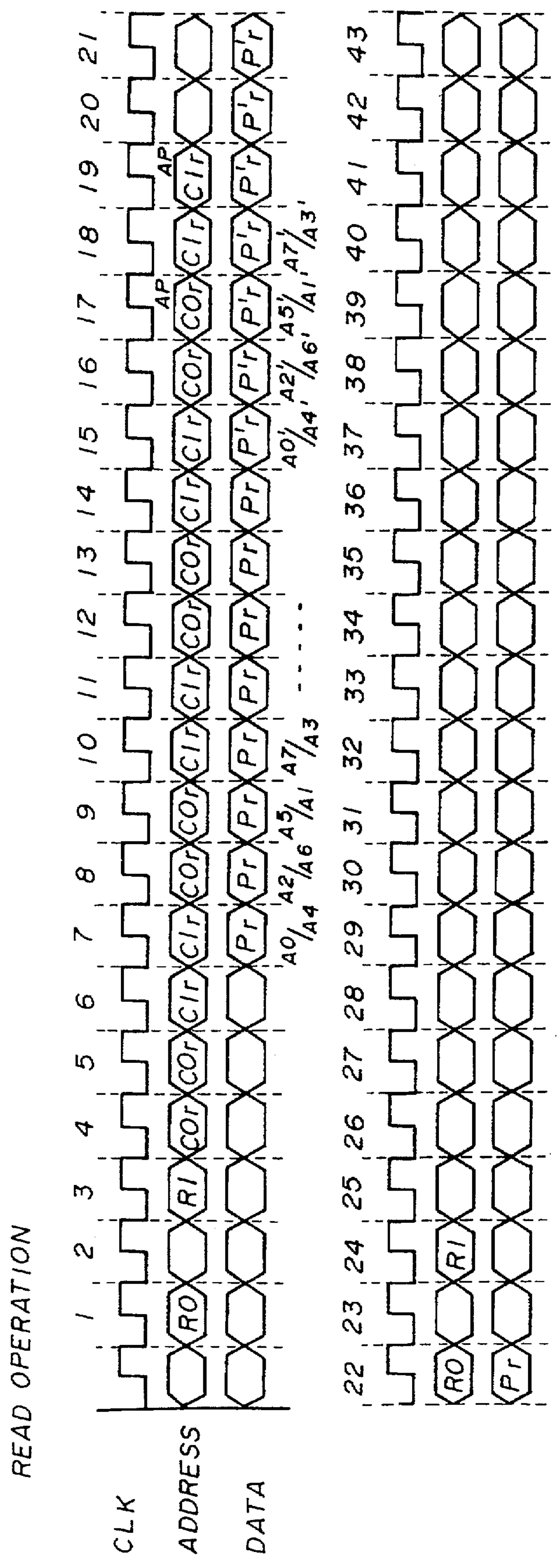
FIG. 12A is a timing chart of a read operation when a single dot corresponds to a 16-bit color.
Figure 12B:
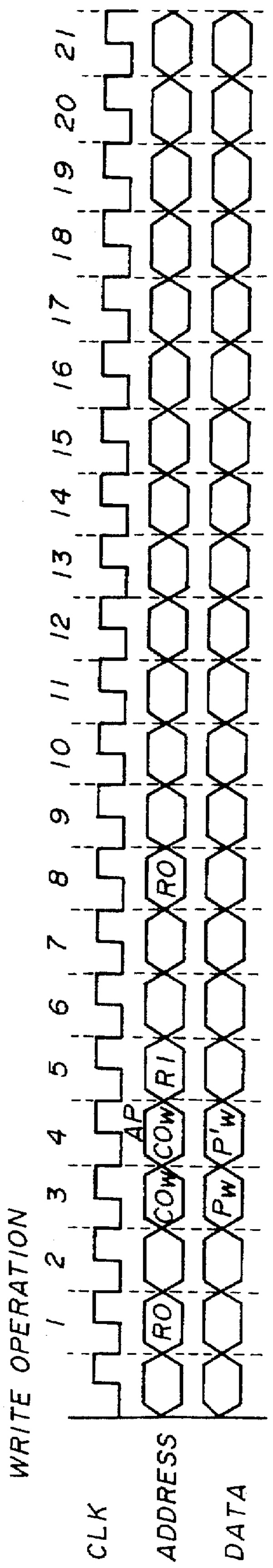
FIG. 12B is a timing chart of a write operation when a single dot corresponds to the 16-bit color.

FIGS. 12A and 12B are timing charts of a read operation and a write operation when a single dot corresponds to the 16-bit color. In this case, the difference from the structure corresponding to that indicated by FIGS. 11A and 11B is that the shift register 11 comprises two buffers each having a capacity of (64 dots×16 bits). Another difference is that each two-dimensional access by (4×2) dots and one-dimensional access by (8×1) dots is performed by two access operations. For example, the first access is made similar to that performed in FIG. 11A. That is, 8-bit data included in the 16-bit data is obtained by the first access. The remaining 8-bit data is obtained by the second access as indicated by "A0'/A4'", "A2'/A6'", . . . in FIG. 12A. It should be noted that the data such as A0' and B0' to be read by the second access is stored in the frame memory portions M0 and M1 as indicated by dotted lines in FIGS. 10B and 10C. Additionally, when 24-bit color is used, three access operations will be performed in a similar manner.

In the present embodiment, as shown in FIG. 11B, only the above-mentioned write operation is performed at a write timing. However, the write operation may be changed to a read modify write for three-dimensional graphics process using the Z buffer method or the alpha blending method. The read modify write is a process for internally processing and writing data immediately after the data is read from a frame memory. A description will now be given, with reference to FIG. 11B, of a read modify write in the Z buffer method. In order to perform the read modify write, a row address (R0) is set in the clock cycle 1, and the column address (C0r) is set and a read command is set in the clock cycle 3. Then, data Zr (not shown in the figure) is read. If the column address (Cow) is set and a write command is set in the clock cycle 8, the data Zw is written at this timing.

Figure 13:
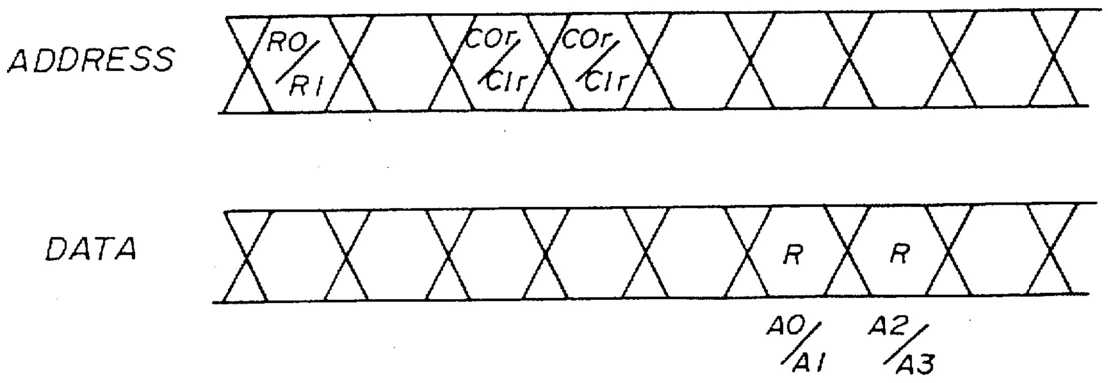
FIG. 13 is a timing chart of a read operation to obtain data to be consecutively arranged.

As previously described, the data A0 to A7, which should be consecutively arranged, can be read by performing four accesses. However, the consecutive data A0 and A1, the consecutive data A2 and A3, the consecutive data A4 and A5, . . . can be read by a single access by alternately using the banks of the frame memory portions M1 and M2 and using the same number banks for two consecutive times. For example, if the data A0 and A1 and the data A2 and A3 are to be accessed, the bank B0 of the frame memory portion M0 is accessed two consecutive times, and the bank B1 of the frame memory portion M1 is accessed two consecutive times. The addresses for such reading operation are specifically shown in FIG. 13.

Figure 14A:
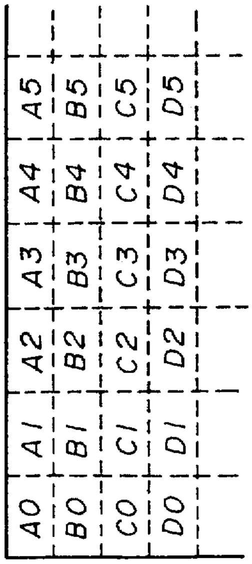
FIG. 14A is an illustration for explaining a data arrangement corresponding to a dot arrangement on a screen.
Figure 14B:
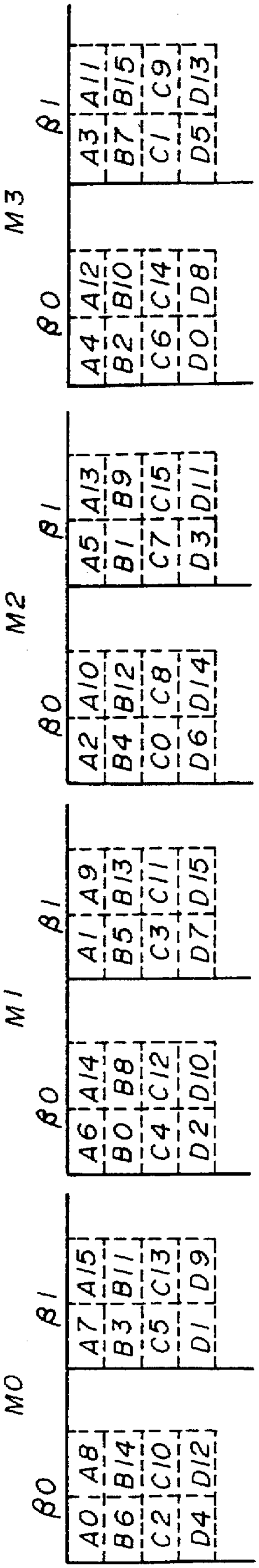
FIG. 14B is an illustration of data stored in banks of each of four frame memory portions.

In the above-mentioned embodiment, data corresponding to two lines is used to perform the two-dimensional access. However, the number of lines is not limited to 2, and more than 3 lines may be accessed by a single access. For example, when 4 lines are to be accessed by a single access, four DDAs, four buffers and four frame memory portions M0, M1, M2 and M3 are provided in the structure shown in FIG. 4. In such a case, the write operation for the pixel data is performed as shown in FIGS. 14A and 14B. FIG. 14A is an illustration for explaining a data arrangement corresponding to the dot arrangement on the screen. FIG. 14B is an illustration of the data stored in the banks β0 an β1 of each of the frame memory portions M0, M1, M2 and M3.

For example, the two-dimensional write operation for the data A0, B0, C0 and D0, the data A1, B1, C1 and D1, the data A2, B2, C2 and D2, . . . is performed as follows:

store the data [A0, B0, C0, D0] in [M0(β0), M1(β0), M2(β0), M3(β0)];

store the data [A1, B1, Cl, D1] in [M1(β1), M2(β1), M3(β1), M0(β1)];

store the data [A2, B2, C2, D2] in [M2(β0), M13β0), M0(β0), M1(β0)]

store the data [A3, B3, C3, D3] in [M3(β1), M0(β1), M1(β1), M2(β1)];

A description will now be given, with reference to FIGS. 15A and 15B, of a second embodiment of the present invention. FIG. 15A is an illustration of a data arrangement which corresponds to a dot arrangement on the screen. FIG. 15B is an illustration of the contents stored in the banks β0 and β1 of each of the frame memory portions M0 and M1.

In the second embodiment of the present invention, the two-dimensional write operation for data A0, A1, A2, A3 . . . , A(n-1), A(n), . . . corresponding to a line A on the screen and data B0, B1, B2, B3, . . . B(n-1), B(n), . . . corresponding to a line B next to the line A is performed as:

store the data [A0, B0] in [M0(β0), M1(β0)];

store the data [A1, B1] in [M1(β0), M0(β0)];

store the data [A2, B2] in [M0(β1), M1(β1)];

store the data [A3, B3] in [M1(β1), M0(β1)];

That is, in general, the data A(n) and the data B(n) are stored in same number banks of different frame memory portions, respectively. With respect to the data A(n-1) and the data A(n) in the same line A, the frame memory portion is changed every time, while the bank number is changed every other time. With respect to the data B(n-1) and the data B(n) in the same line B, the frame memory portion is changed every time, while the bank number is changed every other time.

Concerning each of the frame memory portions M0 and M1, the bank to be written is changed as β0→β0→β1→β1. Thus, the banks are not changed alternately but changed every other two times. In this case, the consecutively arranged data such as (A0/A1), (A2/A3), can be read if the read operation is performed sequentially as:

read the data stored in [M0(β0), M1(β0)];

read the data stored in [M0(β1), M1(β1)];

read the data stored in [M0(β0), M1(β0)];

read the data stored in [M0(β1), M1(β1)];

That is, in the second embodiment, the read operation for the consecutively arranged data is simple as compared to the first embodiment in which different number banks are used for each of the frame memory portions M0 and M1 and the same number bank is accessed two consecutive times.

Figures 16A, 16B, 17:
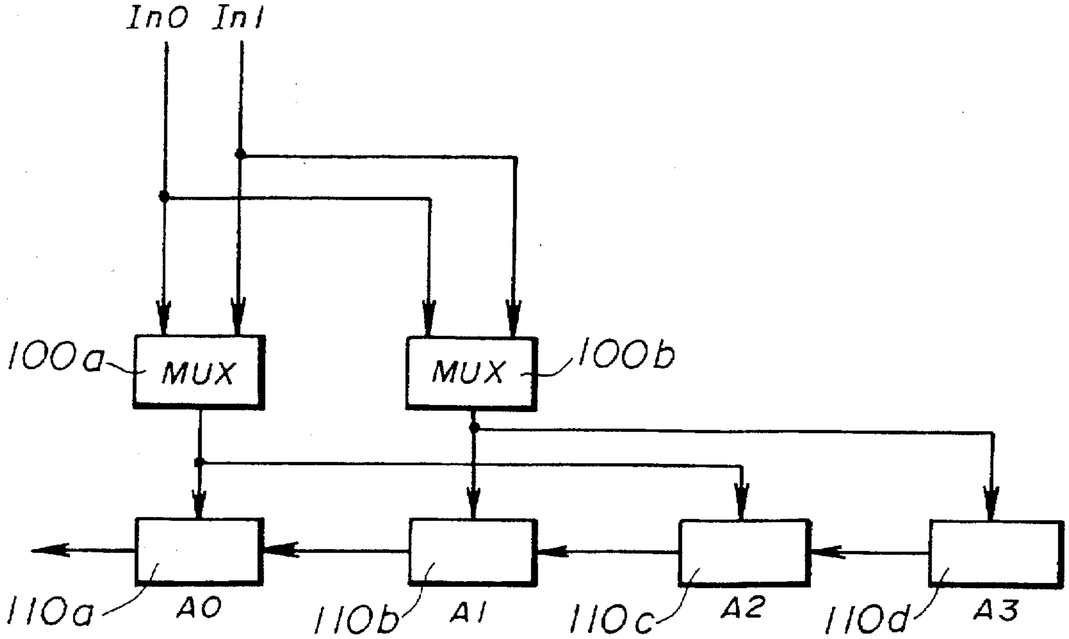
FIG. 16A is an illustration of a data arrangement which corresponds to a dot arrangement on a screen.
FIG. 16B is an illustration of the contents stored in the banks of each of the frame memory portions according to a third embodiment of the present invention.
FIG. 17 is a block diagram for explaining a connection between a multiplexer and a shift register provided in the third embodiment of the present invention.

A description will now be given, with reference to FIGS. 16A, 16B and 17, of a third embodiment of the present invention. FIG. 16A is an illustration of a data arrangement which corresponds to a dot arrangement on the screen. FIG. 16B is an illustration of the contents stored in the banks β0 and β1 of each of the frame memory portions M0 and M1.

In the third embodiment of the present invention, the two-dimensional write operation for data A0, A1, A2, A3 . . . , A(n-1), A(n), . . . corresponding to a line A on the screen and data B0, B1, B2, B3, . . . , B(n-1), B(n), . . . corresponding to a line B next to the line A is performed as:

store the data [A0, B0] in [M0(β0), M1(β0)];

store the data [A1, B1] in [M0(β1), M1(β1)];

store the data [A2, B2] in [M1(β0), M0(β0)];

store the data [A3, B3] in [M1(β1), M0(β1)];

That is, in general, the data A(n) and the data B(n) are stored in the same number banks of different frame memory portions, respectively. With respect to the data A(n-1) and the data A(n) in the same line A, the frame memory portion is changed every other time, while the bank number is changed every time. With respect to the data B(n-1) and the data B(n) in the same line B, the frame memory portion is changed every other time, while the bank number is changed every time.

According to this embodiment, the data to be consecutively arranged is stored in the same frame memory portion. Thus, unlike the second embodiment, the consecutively arranged data cannot be read in a simple manner. However, according to the third embodiment, there is an advantage that the banks of the same frame memory portion are used alternately.

FIG. 17 is a block diagram for explaining a connection between the multiplexer (MUX) and a shift register provided in the third embodiment of the present invention. In the third embodiment, the multiplexer comprises multiplexer (MUX) units 100*a* and 100*b* and the shift register comprises shift register units 110*a*, 110*b*, 110*c* and 110*d*. In FIG. 17, if the data A0 and the data A3 are input to two input terminals In0 and In1, respectively, one of the data A0 and the data A3 is supplied to the shift register units 110*a* and 110*c* via the MUX unit 100*a*. The other one of the data A0 and the data A3 is supplied to the shift register units 110*b* and 110*d* via the MUX unit 100*b*. The shift register units 110*a* and 110*c* receive control commands via control signal lines (not shown in the figure) so that one of the shift register units 110*a* and 110*c* stores the data input thereto. Similarly, the shift register units 110*b* and 110*d* receive control commands via control signal lines (not shown in the figure) so that one of the shift register units 110*b* and 110*d* stores the data input thereto. In this construction, the shift register units 110*a*, 110*b*, 110*c* and 110*d* can store the data A0, A1, A2 and A3, in that order, and the stored data can be sequentially read from the shift register units 110*a*, 110*b*, 110*c* and 110*d*.

The present invention is not limited to the specifically disclosed embodiments, and variations and modifications may be made without departing from the scope of the present invention.

What is claimed is:

1. A data writing and reading method for a frame memory having a plurality of frame memory portions, each of said frame memory portions having a plurality of banks, said frame memory storing sets of data corresponding to an image to be displayed on a screen of a display unit, said data writing and reading method comprising the steps of:

writing one of the sets of data in one of said banks of one of said frame memory portions in accordance with two-dimensional accessing, writing another one of the sets of data in another one of said banks of said one of said frame memory portions when said one of said memory portions is next accessed; and reading the sets of data written in said frame memory in accordance with one-dimensional accessing, wherein said frame memory is divided into two frame memory portions M0 and M1, each of said frame memory portions M0 and M1 having two banks β0 and β1 wherein the sets of data written in said frame memory is image data, wherein said sets of data include at least first sets of data A0, A1, A2, . . . , A(n-1), A(n), . . . arranged in a line A extending in a horizontal direction of said screen and second sets of data B0, B1, B2, . . . , B(n-1), B(n), . . . , arranged in a line B extending in the horizontal direction of said screen, said line B being next to said line A on said screen, and wherein the data A(n) and the data B(n) are stored in same number banks of different frame memory portions, respectively; the data A(n-1) and the data A(n) are stored in different number banks of different frame memory portions, respectively, except for data A(αn-1) and data A(αn) being stored in the different number banks of the same frame memory portion; the data B(n-1) and the data B(n) are stored in different number banks of different frame memory portions, respectively, except for data B(αn- 1) and data B(αn) being stored in different number banks of the same frame memory portion, where a is a power of 2.

2. The data writing and reading method as claimed in claim 1, wherein said sets of data are stored in a sequence:

storing the data in;

storing the data in;

storing the data in;

storing the data in;

storing the data in;

storing the data in;

storing the data in;

storing the data in;

storing the data in, where represents a combination of the data A(n) and the data B(n); M0(β0) represents the bank β0 of said frame memory portion M0; M0(β1) represents the bank β1 of said frame memory portion M0; M1(β0) represents the bank β0 of said frame memory portion M1; M1(β1) represents the bank β1 of said frame memory portion M1.

3. A data writing and reading method for a frame memory having a plurality of frame memory portions, each of said frame memory portions having a plurality of banks said frame memory storing sets of data corresponding to an image to be displayed on a screen of a display unit, said data writing and reading method comprising the steps of:

writing one of the sets of data in one of said banks of one of said frame memory portions in accordance with two-dimensional accessing;

writing another one of the sets of data in another one of said banks of said one of said frame memory portions when said one of said memory portions is next accessed; and reading the sets of data written in said frame memory in accordance with one-dimensional accessing, wherein said frame memory is divided into two frame memory portions M0 and M1, each of said frame memory portions M0 and M1 having two banks β0 and β1 wherein the sets of data written in said frame memory is image data, wherein said sets of data include at least first sets of data A0, A1, A2, A(n-1), A(n), . . . arranged in a line A extending in a horizontal direction of said screen and second sets of data B0, B1, B2, . . . , B(n-1), B(n), . . . , arranged in a line B extending in the horizontal direction of said screen, said line B being next to said line A on said screen, and wherein the data A(n) and the data B(n) are stored in same number banks of different frame memory portions, respectively; with respect to the data A(n-1) and the data A(n) in the same line A, the frame memory portion is changed every time, while the bank number is changed every other time; with respect to the data B(n-1) and the data B(n) in the same line B, the frame memory portion is changed every time, while the bank number is changed every other time.

4. The data writing and reading method as claimed in claim 3, wherein said sets of data are stored in a sequence:

storing the data in;

storing the data in;

storing the data in;

storing the data in;

storing the data in, where represents a combination of the data A(n) and the data B(n); M0(β0) represents the bank β0 of said frame memory portion M0; M0(β1) represents the bank β1 of said frame memory portion M0; M1(β0) represents the bank β0 of said frame memory portion M1; M1(β1) represents the bank β1 of said frame memory portion M1.

5. The data writing and reading method as claimed in claim 3, wherein the step of reading the sets of data stored in said frame memory is performed in a sequence:

reading the data stored in;

reading the data stored in;

reading the data stored in;

reading the data stored in;

reading the data stored in, so that the sets of data to be consecutively arranged are read in a single access to said frame memory.

6. A data writing and reading method for a frame memory having a plurality of frame memory portions, each of said frame memory portions having a plurality of banks, said frame memory stopping sets of data corresponding to an image to be displayed on a screen of a display unit, said data writing and reading method comprising the steps of:

writing one of the sets of data in one of said banks of one of said frame memory portions in accordance with two-dimensional accessing;

writing another one of the sets of data in another one of said banks of said one of said frame memory portions when said one of said memory portions is next accessed; and reading the sets of data written in said frame memory in accordance with one-time dimensional accessing, wherein said frame memory is divided into two frame memory portions M0 and M1, each of said frame memory portions M0 and M1 having two banks B0 and the wherein the sets of data written in said frame memory is image data, wherein said sets of data include at least first sets of data A0, A1, A2, A(n-1), A(n), . . . arranged in a line A extending in a horizontal direction of said screen an d second sets of data B0, B1, B2, . . . , B(n-1), B(n), . . . , arranged in a line B extending in the horizontal direction of said screen, said line B being next to said line A on said screen, and wherein the data A(n) and the data B(n) are stored in same number banks of different frame memory portions, respectively; with respect to the data A(n-1) and the data A(n) in the same line A, the frame memory portion is changed every other time, while the bank number is changed every time; with respect to the data B(n-1) and the data B(n) in the same line B, the frame memory portion is changed every other time, while the bank number is changed every time.

7. The data writing and reading method as claimed in claim 6, wherein said sets of data are stored in a sequence:

storing the data in;

storing the data in;

storing the data in;

storing the data in;

storing the data in, where represents a combination of the data A(n) and the data B(n); M0(β0) represents the bank β0 of said frame memory portion M0; M0(β1) represents the bank β1 of said frame memory portion M0; M1(β0) represents the bank β0 of said frame memory portion M1; M1(β1) represents the bank β1 of said frame memory portion M1.

* * * * *